(12) United States Patent
Pricone

(10) Patent No.: US 10,838,118 B2
(45) Date of Patent: *Nov. 17, 2020

(54) RETROREFLECTIVE TRAFFIC SIGN AND PROCESS AND APPARATUS FOR MANUFACTURING SAME

(71) Applicant: 10x Technology LLC, Libertyville, IL (US)

(72) Inventor: Robert M. Pricone, Libertyville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/005,751

(22) Filed: Jun. 12, 2018

(65) Prior Publication Data
US 2018/0292583 A1 Oct. 11, 2018

Related U.S. Application Data

(63) Continuation of application No. 15/739,632, filed as application No. PCT/US2016/060259 on Nov. 3, 2016, now Pat. No. 10,031,266.
(Continued)

(51) Int. Cl.
*G02B 5/12* (2006.01)
*G02B 5/124* (2006.01)
(Continued)

(52) U.S. Cl.
CPC ........ *G02B 5/124* (2013.01); *B29D 11/00605* (2013.01); *B32B 3/18* (2013.01); *B32B 3/30* (2013.01); *B32B 7/12* (2013.01); *B32B 7/14* (2013.01); *B32B 15/08* (2013.01); *B32B 15/18* (2013.01); *B32B 15/20* (2013.01);
(Continued)

(58) Field of Classification Search
USPC ......... 359/529–532, 542, 546–548, 552, 553
See application file for complete search history.

(56) References Cited

U.S. PATENT DOCUMENTS

| 4,478,769 A | 10/1984 | Pricone et al. |
| 4,486,363 A | 12/1984 | Pricone et al. |
| (Continued) | | |

FOREIGN PATENT DOCUMENTS

| CN | 1168724 A | 6/1996 |
| WO | 2017079392 A1 | 5/2017 |

OTHER PUBLICATIONS

Semochkina, I., "International Search Report and Written Opinion for PCT Patent Application No. PCT/US2016/060259", dated Mar. 23, 2017, 7 pages.
(Continued)

*Primary Examiner* — Jennifer D. Carruth
(74) *Attorney, Agent, or Firm* — Medley, Behrens & Lewis, LLC

(57) ABSTRACT

A method, apparatus for making, and a retroreflective traffic sign consists of a polymeric film having a front face and a rear face, wherein the rear face has a pattern of microprismatic retroreflective elements integrally formed as part of said film; a pattern of cell walls formed of an adhesive-containing polymer defining cells in which the microprismatic retroreflective elements are in the cells; and a substrate is adhered directly to the cell walls formed of the adhesive-containing polymer while leaving an air gap between the microprismatic retroreflective elements and the substrate in the cells.

19 Claims, 4 Drawing Sheets

Related U.S. Application Data

(60) Provisional application No. 62/251,893, filed on Nov. 6, 2015.

(51) Int. Cl.

| | | |
|---|---|---|
| *B29D 11/00* | (2006.01) | |
| *B32B 7/12* | (2006.01) | |
| *B32B 15/08* | (2006.01) | |
| *B32B 15/18* | (2006.01) | |
| *B32B 15/20* | (2006.01) | |
| *B32B 21/08* | (2006.01) | |
| *B32B 27/18* | (2006.01) | |
| *B32B 27/28* | (2006.01) | |
| *B32B 27/30* | (2006.01) | |
| *B32B 27/36* | (2006.01) | |
| *B32B 3/30* | (2006.01) | |
| *B32B 3/18* | (2006.01) | |
| *B32B 7/14* | (2006.01) | |
| *B32B 27/00* | (2006.01) | |
| *E01F 9/688* | (2016.01) | |
| *G09F 13/16* | (2006.01) | |

(52) U.S. Cl.
CPC ............ *B32B 21/08* (2013.01); *B32B 27/00* (2013.01); *B32B 27/18* (2013.01); *B32B 27/285* (2013.01); *B32B 27/308* (2013.01); *B32B 27/365* (2013.01); *E01F 9/688* (2016.02); *G09F 13/16* (2013.01); *B32B 2250/02* (2013.01); *B32B 2262/101* (2013.01); *B32B 2262/106* (2013.01); *B32B 2272/00* (2013.01); *B32B 2307/412* (2013.01); *B32B 2307/416* (2013.01); *B32B 2307/732* (2013.01)

(56) References Cited

U.S. PATENT DOCUMENTS

| | | |
|---|---|---|
| 4,601,861 A | 7/1986 | Pricone et al. |
| 4,618,518 A | 10/1986 | Pricone et al. |
| 5,213,872 A | 5/1993 | Pricone et al. |
| 5,639,530 A | 6/1997 | Miron et al. |
| 6,015,214 A | 1/2000 | Heenan et al. |
| 6,568,817 B1 | 5/2003 | Mimura et al. |
| 6,908,295 B2 | 6/2005 | Thielman et al. |
| 10,031,266 B2 | 7/2018 | Pricone |
| 2001/0026860 A1 | 10/2001 | Benson et al. |
| 2003/0006005 A1 | 1/2003 | Northey |
| 2003/0102591 A1* | 6/2003 | Thielman ............... B23K 26/26 264/166 |
| 2004/0169928 A1 | 9/2004 | Nilsen et al. |
| 2011/0193335 A1 | 8/2011 | Budd et al. |
| 2012/0128940 A1 | 5/2012 | Kamiyama |
| 2013/0114143 A1 | 5/2013 | Thakkar et al. |
| 2015/0170797 A1 | 6/2015 | Perez-Sanchez et al. |
| 2016/0139306 A1 | 5/2016 | Chatterjee et al. |

OTHER PUBLICATIONS

Carruth, Jennifer Doak, "Notice of Allowance and Fees Due for U.S. Appl. No. 15/739,632", dated May 18, 2018, 14 pages.
Carruth, Jennifer Doak, "Notice of Allowability for U.S. Appl. No. 15/739,632", dated Jun. 14, 2018, 11 pages.
Carruth, Jennifer Doak, "Notice of Allowability for U.S. Appl. No. 15/739,632", dated Jun. 26, 2018, 2 pages.
Mohri, Mineko, "International Preliminary Report on Patentability for PCT Patent Application No. PCT/US2016/060259", dated May 8, 2018, 5 pages.
Chinese National Intellectual Property Administration, "Office Action for Chinese Patent Application No. 201680078114.5", dated Feb. 27, 2020, 31 pages.

\* cited by examiner

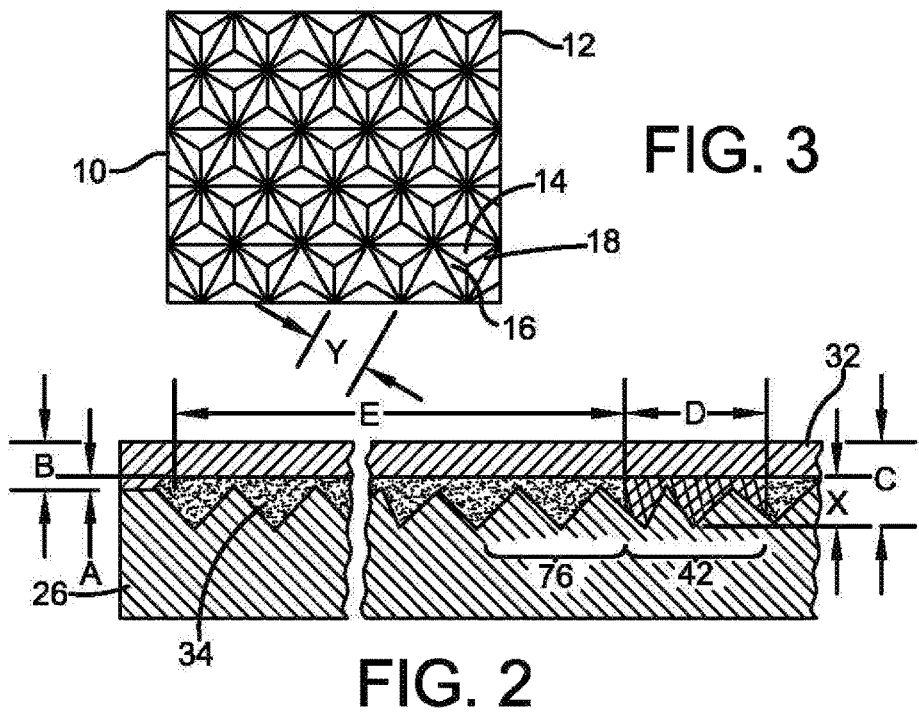
FIG. 3
FIG. 2
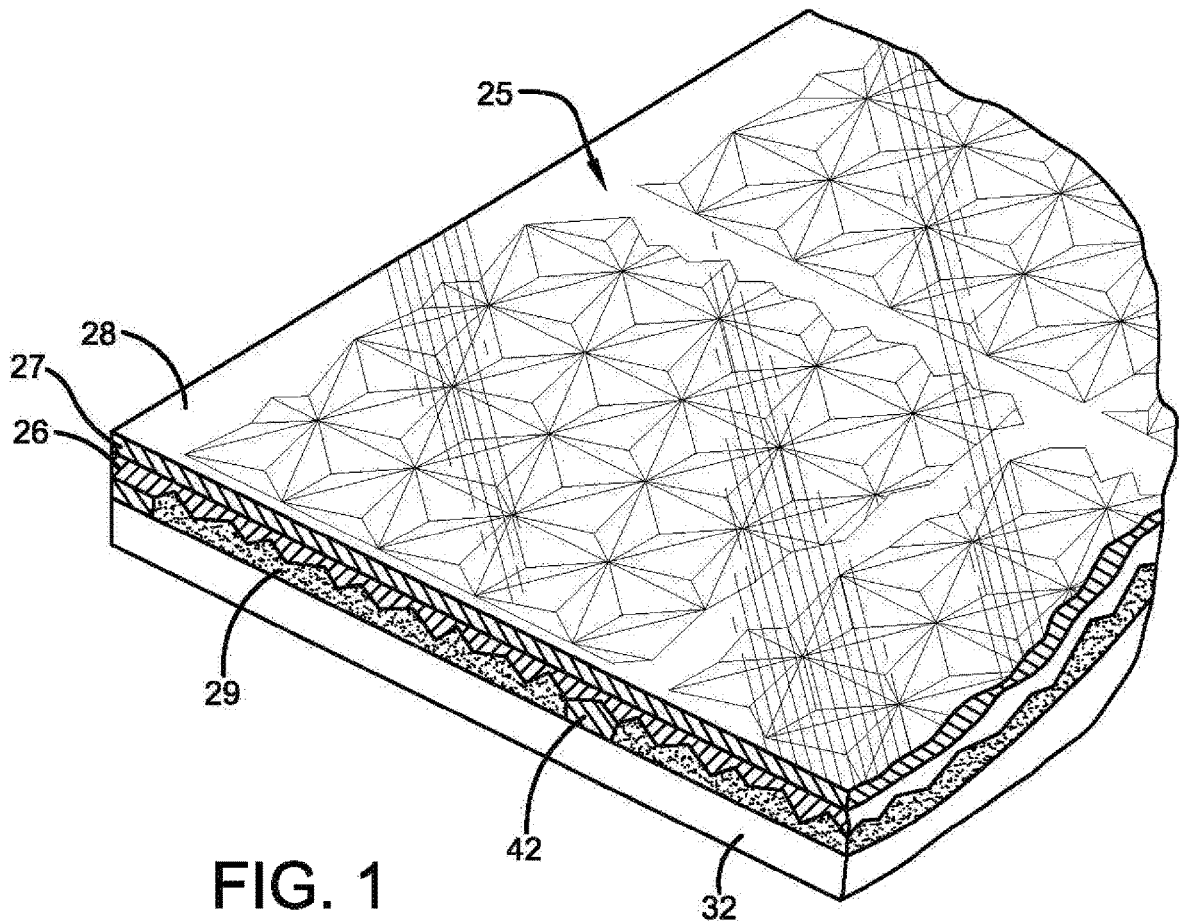
FIG. 1

RETROREFLECTIVE TRAFFIC SIGN AND PROCESS AND APPARATUS FOR MANUFACTURING SAME

CROSS-REFERENCE TO RELATED APPLICATIONS

This application is a continuation of U.S. application Ser. No. 15/739,632, filed Dec. 22, 2017, titled "RETROREFLECTIVE TRAFFIC SIGN AND PROCESS AND APPARATUS FOR MANUFACTURING SAME," which was a national stage entry of PCT/US2016/060259, filed Nov. 3, 2016, which, in turn, claimed the benefit of priority from U.S. provisional application 62/251,893, filed Nov. 6, 2015, titled RETROREFLECTIVE TRAFFIC SIGN AND PROCESS AND APPARATUS FOR MANUFACTURING SAME. Each of these prior applications are herein incorporated by reference.

TECHNICAL FIELD

This application relates to a new retroreflective traffic sign and process and apparatus for directly combining polymeric retroreflective microprismatic thin film to an aluminum backing to produce a finished traffic sign, and, more particularly, a process and apparatus for making traffic signs that are less expensive and just as functional as the current method of manufacturing such signs.

BACKGROUND

Processes and apparatus for embossing precision optical patterns, such as microcubes, or prisms, in a thin film resinous sheet or laminate, are known as referenced in U.S. Pat. Nos. 4,486,363; 4,478,769; 4,601,861; 5,213,872; 6,015,214, and more recently 6,908,295, the subject matter of which patents are all fully incorporated herein by reference. In the production of such synthetic resin optical sheeting film, highly precise embossing (generally exceeding the capabilities of current micromolding processing techniques for synthetic resins), is required because the geometric accuracy of the optical prismatic elements determines the film's optical performance. The above referenced patents disclose particular methods and apparatus for continuously embossing a repeating retro-reflective microprismatic pattern of fine or precise optical quality and detail on one surface of a transparent and thin thermoplastic film to form the surface of the film into the desired retroreflective microstructured pattern.

This application relates to significant improvements to the method and apparatus of prior patent, U.S. Pat. No. 4,618,518, issued Jun. 21, 1986, of which the current inventor is a named co-inventor thereof. This prior patent is incorporated herein by reference.

To manufacture current traffic signs, the thin retroreflective microprismatic pattern in thermoplastic film is then combined with a protective backing layer behind the microprismatic elements, and then there is applied an additional pressure sensitive adhesive and a release liner. Subsequently the release liner is removed and the adhesively backed film is then applied to an underlying aluminum or other material substrate. This combination of materials is known as reflective sheeting, in which the film is produced in rolls in various specified colors and then laminated to the aluminum or other material panels to produce the primary components for traffic signs. Lettering and symbols can be printed or laminated as film on the front film surface to provide text or other instructions to a driver. Prior to corner cube prisms, products such as those consisting of glass bead film, known as engineer grade, and high-intensity films have been used for decades. More recently the improved versions use micro prismatic optics formed on the reflective film, which is more efficient and capable of a diverse range of reflectivity that is beneficial to the driver at night. Nonetheless, the retroreflective sheeting products currently produced, as manufactured by numerous companies, are produced with the backing layer, the adhesive layer and the release liner and then shipped to sign shops that fabricate the signs where the film is then laminated to aluminum or other material panels using the pressure sensitive adhesive. This technique currently now is, and has been universally used for decades as the primary method of manufacturing retroreflective traffic signs. There are several companies that manufacture the retroreflective sheeting film and many companies that provide the aluminum panels. Sign makers purchase the reflective sheeting with the back layer, adhesive layer and release liner from one source and the aluminum panels are purchased from another source and then the sign shops combine the two components.

SUMMARY

It is one feature of the present disclosure to provide a new retroreflective traffic sign consisting of a polymeric film having a front face and a rear face having an optical pattern of microprismatic retroreflective elements integrally formed as part of such film, a pattern of walls formed of an adhesive containing polymer defining cells in which microprismatic elements are in the area defined by the cell walls, and an aluminum (or other material) substrate is adhered directly to such cell wall polymer.

It is another feature of the disclosure to provide a method for forming a retroreflective traffic sign, comprising passing a film having retroreflective elements on one side thereof past a station for applying a viscous polymer containing an adhesive in a pattern defining cell walls around areas of the retroreflective elements; then applying the film having the viscous polymer directly to an aluminum substrate and laminating the film to the substrate via the cell walls (meaning using the cell walls as the adhesive for lamination) while leaving the remaining retroreflective elements surrounded by air, and allowing the viscous material to cure while adhered to the substrate. It is still a further feature of the disclosure to provide apparatus for producing a retroreflective traffic sign, including means for feeding a thin film having retroreflective elements on one side past a rotary screen having a pattern defining closed areas and open areas that will allow passage of a viscous adhesive containing polymer through the open areas of the screen onto the side of the film having the retroreflective elements to provide walls defining cells surrounding predetermined areas of the retroreflective elements; means for feeding the film with the viscous polymer cell walls onto an aluminum substrate, and means for laminating the film to such substrate to provide a traffic sign needing only the proper directional materials (lettering or symbols) to be applied to the front face of the film.

The technology presented herein is for a new composite traffic sign, and a process that permits one to laminate only a thin, retroreflective microprismatic film layer directly to large aluminum panels, without the backcoating, adhesive layer and release liner as currently required. The combined materials now represent a finished fully functional traffic sign when cut or punched into the finished sign shape, and only the lettering or symbols need to be applied as is currently done.

In the case of an overhead guide sign, green or blue retroreflective micro prismatic film is laminated directly to large aluminum panels, typically 4'×8' in size (32 square feet), which are then joined together by spot welding or riveting to produce the entire larger background of the sign. Only the legend, text or symbols would have to be applied to the front face of the film. This product would be sold into sign shops, eliminating the need for one source of retroreflective sheeting and another source of aluminum and then combining the two components. It also eliminates the cost of the protective backing of the micro prismatic layer as well as the pressure sensitive adhesive and release liner. Therefore, in this new traffic sign product, the overall material costs are reduced, and even more importantly, the cost of labor to laminate the retroreflective sheeting component to the aluminum, is eliminated, thereby significantly reducing the total cost to the sign fabricator.

This could be done with all the primary colors for retroreflective sheeting, so when combined with the aluminum component this will allow the sign manufacturer to provide virtually every traffic sign shape and color. Because there are many types of microprismatic reflective sheeting (provided by different optics) identified in the ASTM D4956-13 specifications, one need only provide a thin microprismatic thin-film component in compliance with each specification, each to be laminated directly to an aluminum panel, thereby satisfying all of the industry needs. Sheets of the micro prismatic film layer laminated to aluminum panels can be shipped as large sheets stacked on skids to sign fabricators who can cut the panels to size and add the specific text and symbols as required. An embodiment of the product disclosed herein significantly reduces the overall cost to the sign fabricators, eliminating much, of their labor other than applying the specific front message on the sign.

In an embodiment, a retroreflective traffic sign consists of a polymeric film having a front face and a rear face, wherein the rear face has a pattern of microprismatic retroreflective elements integrally formed as part of said film; a pattern of cell walls formed of an adhesive-containing polymer defining cells in which the microprismatic retroreflective elements are in the cells; and a substrate is adhered directly to the cell walls formed of the adhesive-containing polymer while leaving an air gap between the microprismatic retroreflective elements and the substrate in the cells.

In an embodiment, a method for forming a retroreflective traffic sign, comprises: passing a film having retroreflective elements on one side thereof past a station; at the station, applying a viscous polymer containing an adhesive in a pattern defining cell walls around areas of the retroreflective elements; applying a side of the film having the cell walls directly to a substrate; laminating the film to the substrate via the cell walls; wherein the side of the film having the cell walls, the cell walls, and the substrate define an air gap; and allowing the viscous material to cure while the film is adhered to said substrate.

In an embodiment, an apparatus for producing a retroreflective traffic sign, comprises: means for feeding a thin film having retroreflective elements on one side of the film past a rotary screen having a pattern defining closed areas and open areas that will allow passage of a viscous adhesive-containing polymer through the open areas of the screen onto the side of the film having the retroreflective elements thereon to provide walls defining cells surrounding predetermined areas of the retroreflective elements; means for feeding the film with the viscous polymer cell walls onto a substrate; and means for laminating the film to the substrate via said viscous polymer, wherein the traffic sign optionally includes drive related directions on the front face of the film.

BRIEF DESCRIPTION OF THE DRAWINGS

FIG. 1 is a perspective view of a section of a traffic sign (without front face printing) produced in accordance with the present invention;

FIG. 2 is a partial enlarged sectional elevational view representative of the traffic sign panel of the current invention;

FIG. 3 is a plan view representative of one cell area of a type of microprisms that may be used in the traffic sign;

DETAILED DESCRIPTION

Figure 4:
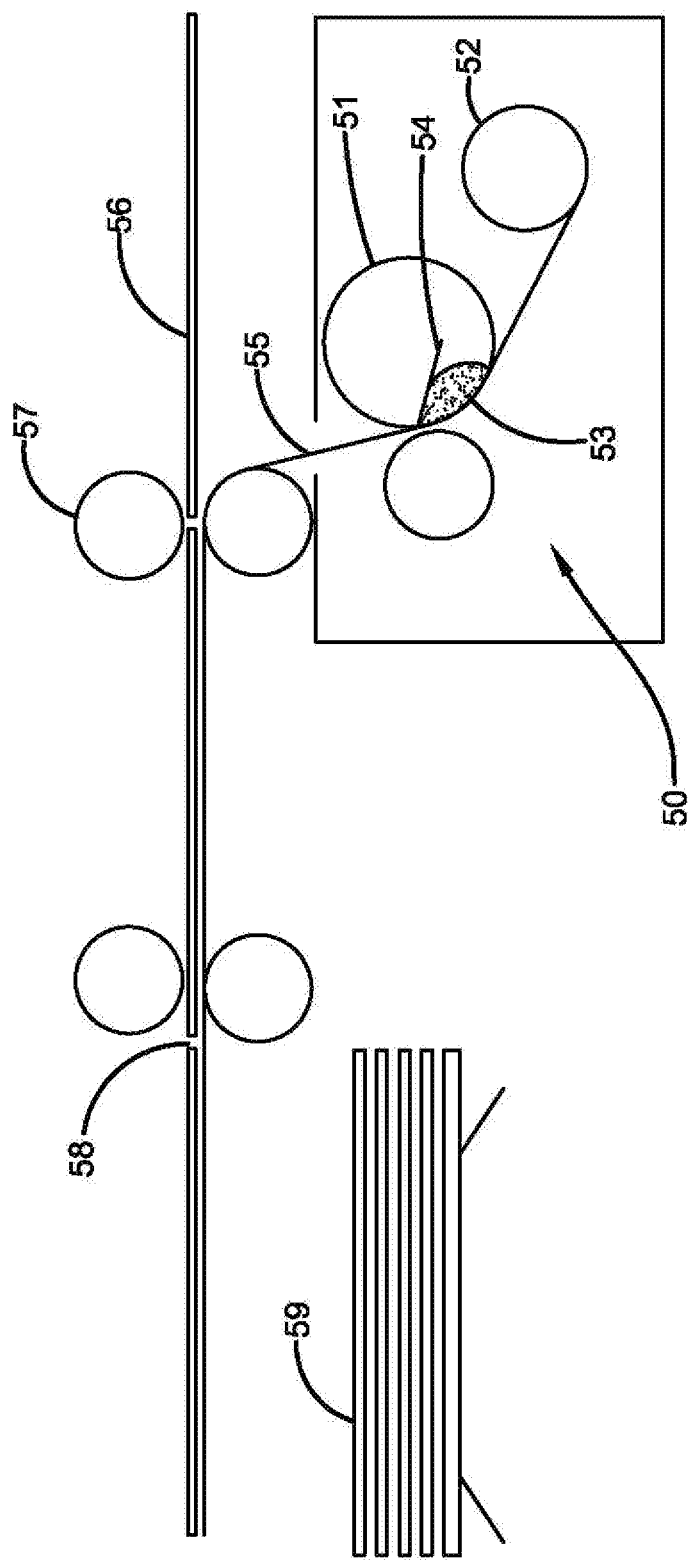
FIG. 4 is a schematic view of the apparatus and which shows the process of forming the novel traffic sign.

Referring now to FIG. 1, the retroreflective sign panel, designated 25, includes a microprismatic retroreflective film 26 that is a two layer thermoplastic material manufactured in accordance with processes disclosed herein. As herein shown, the microprismatic retroreflective film 26 has a front layer 27 with an obverse surface 28 and the rear or reverse surface 29 upon which is formed (preferably by embossing) a microprismatic type retroreflective pattern as illustrated in FIG. 3. For purposes hereof, the microprisms (often referred to as cube-corners or corner-cubes) may consist of different arrays of different elements, but the formation of the new traffic sign may include any of such precise microprisms. The thermoplastic web or microprismatic retroreflective film 26 may be on the order of about 0.006 inch (0.15 mm) in thickness, such as, for example, in the range of 0.005 to 0.01 inches (0.127 mm to 0.254 mm), or 0.006 to 0.009 (0.1524 mm to 0.2286 mm), depending on the depth of the prisms.

Referring to FIG. 3, the numeral 10 indicates generally a segment of a microprismatic type reflective thermoplastic web used in forming the laminate of the present invention. As seen in FIG. 3 there is depicted the rear surface of a portion of flexible retroreflective film 12 fashioned from transparent thermoplastic material in web form which has formed thereon, preferably by embossing, a retroreflective and repeating pattern of microprismatic reflector elements characterized by cube faces 14, 16 and 18. In a preferred aspect of the invention, the film 12 is formed from an impact modified acrylic having UV inhibitors or absorbers added thereto, and which, prior to embossing, had parallel front and back surfaces and was initially on the order of about 0.15 mm (0.006 inches) thick. One such material is known as Plexiglas DR 101, sold by Arkema Company.

The microprismatic pattern formed on sheeting 12 is formed in an optically precise finely detailed pattern as known in the art. For example, as seen in FIG. 2, the cube apex to groove of the microprismatic pattern as embossed into the film 12 (or as depicted as 26 in FIG. 1) may be on the order of 0.8 mm (0.00338 inch) (dimension X). As shown at dimension Y in FIG. 3 the prisms formed on sheet 12 may be spaced apart (meaning the distance Y is the distance across the prism in its greatest dimension) by a distance on the order of about 0.18 mm (0.0072 inch), such as 0.1 mm to 0.25 mm, or 0.15 mm to 0.23 mm, for the depth as shown at X. While the prism pattern shown in FIGS. 1 and 3 illustrates prisms each formed with their optical axis normal to the front face of film 12, it is to be understood that other versions and patterns may also be utilized as forming the retroreflective web of the laminate of the present invention. In an embodiment, the X dimension may, for example, be about 0.05 mm to about 2 mm, or 0.1 mm to 0.25 mm, or 0.15 mm to 0.23 mm, the precise value to be dependent on the depth of the prisms which in part relates to the optical design selected. In an embodiment, the Y dimension may vary depending on the optical design of the prisms.

Retroreflectivity is achieved by microprismatic type reflector elements primarily through the principle of total internal reflection. In order to best achieve this it is known in the art to provide an air gap between the prism apices and any substrate to which the film is attached. Thus for example, as shown in U.S. Pat. No. 5,930,041, which is incorporated herein by reference, cell walls around an array of microprisms are provided by sonic welding of a backing layer to the film; later an adhesive layer and a release liner are provided to the roll of welded film.

In accord with the present technology, no backing layer is needed to provide the air gap. In this case, a cell wall structure, generally at 42 (FIG. 1) provides discrete cells providing an air gap 34 between the microprismatic elements and an aluminum (or other material) substrate 32. For illustrative purposes only, the air gap in FIGS. 1 and 2 are represented by a dotted arrangement, it being understood that in actual formation there is no material in that space. In an embodiment, the cell walls formed from adhesive may be disposed directly on the retroreflective microprismatic elements. The pattern in the area defined by the resulting walls of the cells may vary depending upon the cell size and pattern area required for the amount of retroreflection needed. Typical examples of the pattern cell walls range from about 0.010 inch to about 0.020 inch (0.254 mm to 0.508 mm) in thickness (width), such as 0.3 mm to 0.5 mm, or 0.35 mm to 0.45 mm. The cell wall width will depend upon both the nature of the prism design and the amount of reflectivity required to meet the specifications.

Other possible alternatives to aluminum for the substrate are, sheet steel that has been powder coated or galvanized for outdoor applications, polymer composites such as layers of PEEK, polycarbonate, PMMA, or other combinations that would provide strength and rigidity, including recycled polymer combinations, recycled rubber-tire composites and other possible layers such as carbon fiber, fiberglass and wood composites that have been treated for outdoor use.

Figure 5:
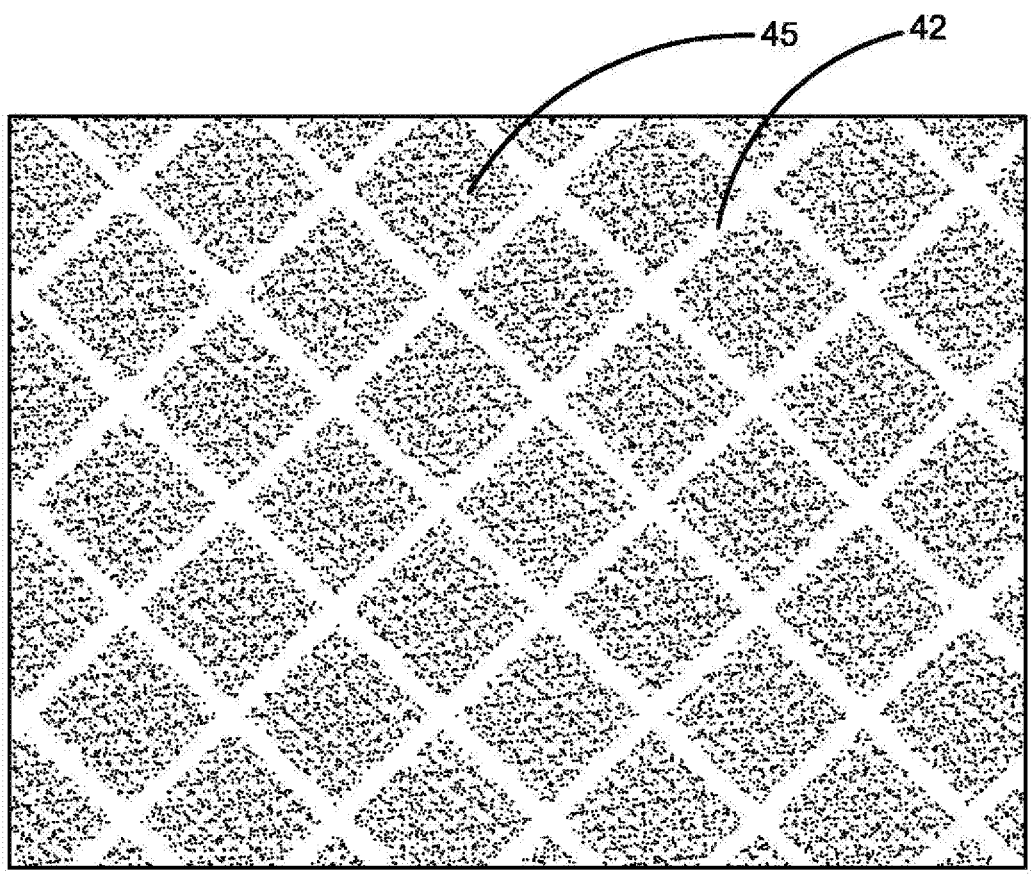
FIG. 5 is representative of a section of the rotary screen used to print the cell walls of the sign.
Figure 6:
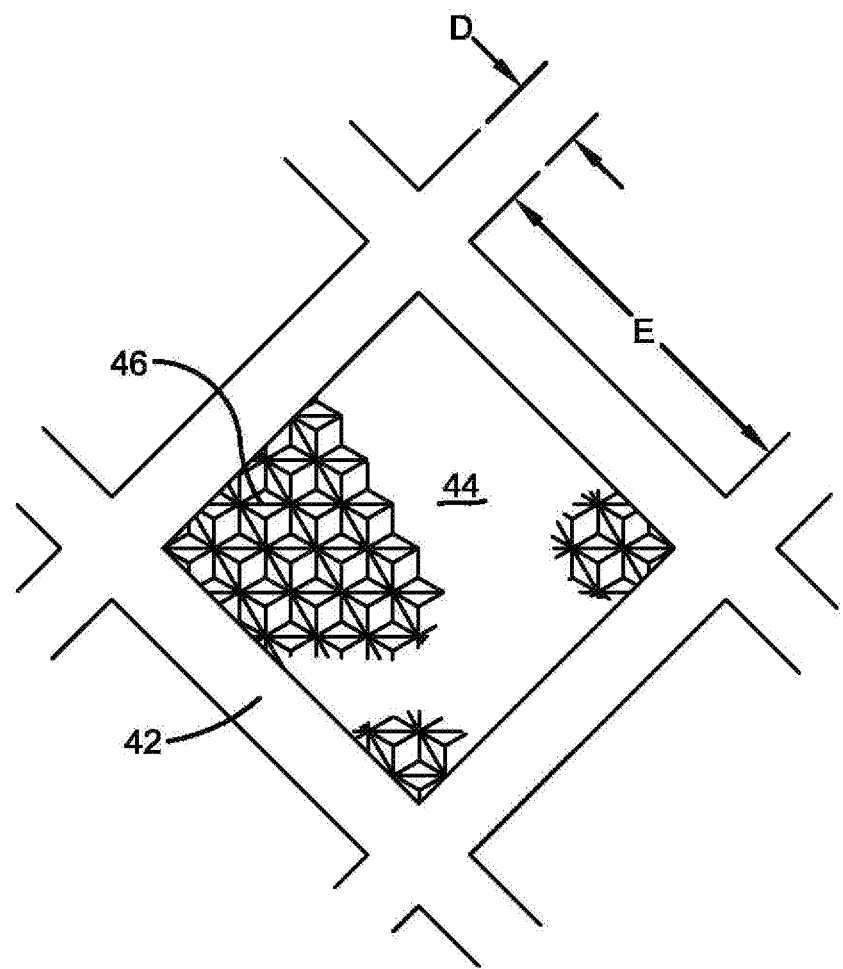
FIG. 6 is a greatly enlarged representative area of one size of cell defined by cell walls and encompassing a predetermined area of microprismatic elements.

Referring now to FIGS. 5 and 6, the numeral 40 indicates generally such a selected pattern. Each cell wall 42 represents polymeric adhesive (or sealant) on the reverse (prismatic side) surface of the thermoplastic film (FIG. 2, reference 26). Each cell with diamond shaped area 44 circumscribes an area that has a volume in the composite which comprises an air gap (FIG. 2, reference 34) between the microprismatic corner cube surfaces (FIG. 1, reference 29) and the aluminum backing 32. While this is described as film (e.g. as shown in FIG. 6), it is also representative of a section of the screen 51 (FIG. 4) through which a viscous polymer is applied, as hereinafter described. As best seen in FIG. 6, the actual percentage of area in which there is an air gap over the prismatic elements, is determined by the thickness or width of each cell wall 42, and the pattern selected for the air cell 44.

In the embodiment herein illustrated, each discrete air cell 44 has an area characterized by the dimension E in FIGS. 2 and 6 (since FIG. 6 shows a square air cell 44 the area of the air cell 44 is E squared). The dimension D is the thickness of the cell wall 42. As hereinabove described, the percentage of surface area available for retroreflectivity may be adjusted by changing the dimensions D and E as shown in FIGS. 2 and 6. Where, for example, as mentioned above, D is, for example, 0.015 inch (0.381 mm) and the dimension E is for example 0.200 inch (5.08 mm), the effective surface area of microprismatic elements available for retroreflection is about 84%. If dimension D is 0.027 inch (0.685 mm) and dimension E is 0.138 inch (3.50 mm), approximately 70% of the total surface of the resulting composite preserves retroreflective characteristics. With the dimension D of 0.029 inch (0.736 mm) and a dimension E of 0.096 inch (2.43 mm) than, approximately 55% of the total surface of the resulting composite retains retroreflective properties. In a preferred embodiment, dimension D is 0.030 inch (0.762 mm) and dimension E is 0.170 inch (4.31 mm) to give an effective area of reflection of about 73%.

In an embodiment, the dimension E may range from for example, about 0.01 to about 1 inch, about 0.1 to about 0.5 inches, or about 0.15 to about 0.35 inches. In an embodiment the effective area of reflection is about 50% to about 99%, such as 55% to about 90%, or about 60% to about 85%.

FIG. 4 shows, in schematic form, a preferred arrangement of equipment and sequence of operations to produce the retroreflective traffic sign composite of the type shown in FIG. 1.

The application of the adhesive cell wall 53 that is a viscous adhesive containing polymer (for purposes hereof, also generally referred to as a sealant), is applied directly via blade 54 to the microprismatic side of the microprismatic film 55 and then laminated at 57 to aluminum panels 56. The blade 54 is a flexible metal blade that is pushed against the metal screen to apply the adhesive containing polymer to the microprismatic film through pores in the screen. The viscous adhesive containing polymer, may, for example, have a viscosity of 250,000 cP to 100,000,000 cP, such as 1,000,000 to 8,000,000, or 3,000,000 to 5,000,000.

In an embodiment, the adhesive cell wall sealant 53 is applied by a rotary screen drum 51 in a diamond pattern with a cell size in the range of from about 0.096 inch (2.43 mm) to 0.300 inch (7.62 mm) and a wall width from about 0.010 inch (0.25 mm) to about 0.050 inch (1.27 mm). Variations in shape of the cells, the pattern repeat of the cells, and width of the cell walls 42 may be accomplished by changing the printing screen used on the screen printing drum 51. Also, the width of the film fed from roll 52 may be of various sizes, and the printing screens used will be of a compatible width.

Several preferred polymer formulations for the viscous adhesive cell wall sealant 53 have been identified that can be printed to form cell walls 42 that have adhesion to both the microprismatic retroreflective film (FIG. 1, reference 26) and the aluminum (or other metal) substrate 56 (the finished panel designates the substrate as numeral 32 in FIGS. 1 and 2).

The preferred material to print the adhesive cell wall sealant 53 that will have adhesion to the microprismatic retroreflective film 26 is a silicone rubber adhesive. Silicone rubber is an elastomer (rubber-like material) composed of silicone—itself a polymer—containing silicon together with carbon, hydrogen, and oxygen. Silicone rubbers are widely used in industry, and there are multiple formulations. Silicone rubbers are often one- or two-part polymers, and may contain fillers to improve properties or reduce cost. Silicone rubber is generally non-reactive, stable, and resistant to extreme environments and temperatures from −55° C. to +300° C. while still maintaining its useful properties.

Due to these properties and its ease of manufacturing and shaping, silicone rubber can be found in a wide variety of products, including: automotive applications; cooking, baking, and food storage products; apparel such as undergarments, sportswear, and footwear; electronics; medical devices and implants; and in home repair and hardware with products such as silicone sealants.

Typical physical properties for silicone rubber adhesives are as shown in the table below:

| Mechanical properties | |
|---|---|
| Hardness, shore A | 10-90 |
| Tensile strength | ~11 N/mm$^2$ |
| Elongation at break | 100-1100% |
| Maximum operational temperature | +300° C. |
| Minimum operational temperature | −120° C. |

One example of a silicone rubber sealant that can be printed to form cell walls 42 is a product such as Master Sil 713, available from MASTERBOND a low viscosity silicone adhesive/sealant that cures within an hour. It has a viscosity of 3,000 cps and exhibits a tensile strength of 125 psi and more than 200% elongation. Hardness is Shore A 30.

Alternatively, other adhesives that suitably function to bond the thin polymer reflective layer to the rigid backing sheet may be used that have the same or similar properties as the silicone adhesive mentioned above. One alternative to silicone is a water-borne polymeric systems consisting of acrylic/urethane copolymers.

High elongation at break, e.g., 100% to 1100%, or 200% to 500%, and low Shore A hardness, e.g., 10-90, or 20 to 60 are physical requirements for the sign, because an aspect of the solvent used to print the cell walls that bonds the reflective film to the aluminum backing is that it be flexible enough to compensate for the difference in coefficient of thermal expansion between the thermoplastic DR 101 reflective film, and the aluminum backing. The degree of flexibility, and the height and thickness of the cell wall required can be calculated allowing the cell wall to flex so that retroreflective film layer does not fracture during expansion or contraction of the aluminum backing.

In an embodiment, all of the properties of this construction will meet the requirements as specified in the test procedures for reflective sheeting in ASTM D4956-13, Standard Specification for Retroreflective Sheeting for Traffic Control.

As an example, paragraphs 6.9 and 7.5 of such Specification recite: "6.9 Adhesion—When tested in accordance with 7.5, the adhesive backing of the retroreflective sheeting shall produce a bond that will support a 1¾-lb (0.79-kg) weight for adhesive classes 1, 2, and 3 or a 1-lb (0.45-kg) weight for adhesive class 4 for 5 min, without the bond peeling for a distance of more than 2 in. (51 mm)."

In this case because a separate adhesive backing is not used, adhesion is measured between the polymer microprismatic layer 29 and the aluminum substrate 32.

A preferred form of the apparatus to apply the adhesive cell wall sealant 53 is application station 50 consisting of a rotary screen printer manufactured by Stork Bragant BV of Boxmeer, Holland, of the type having a drum with an electroformed mesh screen 51. The screen 51 will have desired openings defining cell walls 42 and the areas 45 on the screen (FIG. 5) will be solid on the screen to define the open areas 44 for the air gaps (FIG. 6).

In an embodiment, the microprismatic retroreflective film 26 is provided on a roll 52.

The adhesive cell wall sealant 53 is pushed through the rotary screen 51 using a flexible stainless steel blade 54, printing the adhesive cell wall sealant as the desired pattern on the corner cube surface of the microprismatic film 55, which is then laminated to aluminum sheets 56 at a pressure of about 15-20 psi, using pressure rolls 57. The printing and lamination speed will be about 10 feet a minute. The microprismatic film will be laminated continuously to aluminum sheets 56 that are typically four feet wide by eight feet long.

According to the ASTM D4956-13 Standard Specification for Retroreflective Sheeting for Traffic Control, the typical aluminum sign blanks are made of 0.080 inch (2.03 mm) thick 6061-T6 aluminum. More recently it is believed that other metals have been used as the substrate. In an embodiment, the metal substrate may range from 0.05 to 0.75 inches in thickness, such as, for example, 0.07 to 0.5 in, or 0.075 to 0.01 in. For purposes hereof, the word "metal" as used in the claims is intended to cover aluminum (as the approved version) and any other approved metal substrate that meets ASTM D4956 specifications.

The combined retroreflective film and aluminum panels can be separated by cutting the retroreflective film between individual panels 58, so the panels can be stacked (as shown at reference 59) and allowed to finish curing.

What is claimed is:

1. A retroreflective sheet and substrate comprising:
    a polymeric film having a front face and a rear face;
    said rear face having a pattern of microprismatic retroreflective elements integrally formed as part of said polymeric film, a pattern of cell walls formed of an adhesive, defining cells in which the microprismatic retroreflective elements are in the cells, the polymeric film being provided without any protective backing layer; and
    a substrate, the substrate adhered directly to the cell walls formed of the adhesive, and leaving an air gap between the rear face and the substrate, the air gap bounded by the pattern of microprismatic retroreflective elements, the cell walls, and the substrate.

2. The retroreflective sheet and substrate of claim 1, wherein the adhesive has a viscosity of 250,000 cP to 100,000,000 cP.

3. The retroreflective sheet and substrate of claim 1, wherein the substrate is selected from aluminum, powder coated steel, galvanized steel, PEEK, polycarbonate, PMMA, recycled tire rubber composites, carbon fiber, fiberglass, and wood composites treated for outdoor use.

4. The retroreflective sheet and substrate of claim 1, wherein the microprismatic retroreflective elements include corner cube prisms.

5. The retroreflective sheet and substrate of claim 1, wherein the retroreflective sheet meets the requirements of the ASTM D4956-13 standard.

6. The retroreflective sheet and substrate of claim 1, wherein the cell walls formed from adhesive are disposed directly on the retroreflective microprismatic elements.

7. The retroreflective sheet and substrate of claim 1, wherein the polymeric film is a thermoplastic.

8. The retroreflective sheet and substrate of claim 1, wherein the thickness of the cell walls extending from the polymeric film to the substrate is 0.254 mm to 0.508 mm.

9. The retroreflective sheet and substrate of claim 1, wherein the polymeric film is 0.127 mm to 0.254 mm in thickness.

10. The retroreflective sheet and substrate of claim 1, wherein the front face is an exterior face of the sheet.

11. The retroreflective sheet and substrate of claim 1, wherein the front face is at least partly covered with lettering or symbols.

12. The retroreflective sheet and substrate of claim 1, wherein the substrate is selected from aluminum, powder coated steel, galvanized steel, PEEK, polycarbonate, PMMA, recycled tire rubber composites, carbon fiber, fiberglass, and wood composites treated for outdoor use.

13. A method for forming a retroreflective sheet and substrate, comprising:
    passing a film having retroreflective elements on one side thereof past a station;
    at the station, applying to the film an adhesive in a pattern defining cell walls around areas of the retroreflective elements;
    adhering the film to a substrate by contacting the cell walls to the substrate; and
    curing the adhesive while the film is adhered to said substrate;
    wherein the areas of the retroreflective elements, the cell walls, and the substrate define an air gap.

14. The method of claim 13, wherein the retroreflective elements are integrally formed as part of said film.

15. The method of claim 13, wherein the substrate is selected from aluminum, powder coated steel, galvanized steel, PEEK, polycarbonate, PMMA, recycled tire rubber composites, carbon fiber, fiberglass, and wood composites treated for outdoor use.

16. The method of claim 13, wherein the retroreflective elements are corner cube prisms.

17. The method of claim 13, further comprising applying lettering or symbols to the sheet.

18. The method of claim 13, wherein the thickness of the cell walls extending from the film to the substrate is 0.254 mm to 0.508 mm.

19. The method of claim 13, wherein the film is 0.127 mm to 0.254 mm in thickness.

\* \* \* \* \*